United States Patent [19]

DeCaro

[11] Patent Number: 4,491,443

[45] Date of Patent: Jan. 1, 1985

[54] MODIFIED QUICK RELEASE ADAPTER

[75] Inventor: Charles J. DeCaro, Pittsburgh, Pa.

[73] Assignee: Textron Inc., Providence, R.I.

[21] Appl. No.: 466,637

[22] Filed: Feb. 18, 1983

Related U.S. Application Data

[63] Continuation-in-part of Ser. No. 437,542, Oct. 29, 1982.

[51] Int. Cl.³ .................................... B23B 31/10

[52] U.S. Cl. ............................ 408/239 A; 408/226; 279/14; 279/35; 279/79; 279/89; 279/97

[58] Field of Search .................. 279/77, 1 B, 14, 106, 279/35, 76, 75, 79, 84, 89, 97, 1 C, 18, 118, 93; 408/186, 226, 187, 239 A, 239 R; 7/142, 138, 165, 170; 403/330, 328, 324, 325

[56] References Cited

U.S. PATENT DOCUMENTS

| | | | |
|---|---|---|---|
| 820,263 | 5/1906 | Schmid | 279/18 |
| 1,428,754 | 9/1922 | Carr | 279/18 |
| 2,095,852 | 10/1937 | Booth | 279/76 |
| 2,324,130 | 7/1943 | Beckwith | 279/18 |
| 2,671,667 | 3/1954 | Flory | 279/18 |
| 3,023,015 | 2/1962 | Pankow | 279/14 |
| 4,057,260 | 11/1977 | Sigott | 279/76 |
| 4,402,519 | 9/1983 | Meaden et al. | 279/76 |

FOREIGN PATENT DOCUMENTS

| | | | |
|---|---|---|---|
| 500696 | of 1920 | France | 279/18 |

*Primary Examiner*—Z. R. Bilinsky
*Assistant Examiner*—Thomas M. Kline
*Attorney, Agent, or Firm*—Webb, Burden, Robinson & Webb

[57] ABSTRACT

An adapter for a torquing tool includes an elongated body having a bore at at least one end to accommodate a working member such as a drill bit or fastener driver and a coupling means for detachably attaching the body to the tool so that at least a portion of the adapter is not housed within the tool. The improvement comprises a quick release means internal of the portion of the body member that is not housed within the tool to detachably retain the working member within the bore and to the elongated body and means associated with said bore and said working member for transmitting torque from the tool to the working member. The preferred quick release means is a spring loaded shuttle positioned in an opening radially through the body member and in communication with the bore. The preferred torque transmitting means is a pair of corresponding, opposed surfaces disposed on the bore and working member, respectively.

4 Claims, 6 Drawing Figures

MODIFIED QUICK RELEASE ADAPTER

CROSS-REFERENCE TO RELATED APPLICATIONS

This application is a continuation-in-part of U.S. application Ser. No. 437,542, filed Oct. 29, 1982.

FIELD OF THE INVENTION

My invention relates to adapters for drilling and torquing tools and more particularly, to adapters and reversible adapters for use with a standard power unit for drilling a hole and thereafter for torquing a fastener into the hole just drilled.

DESCRIPTION OF THE PRIOR ART

There are many applications which require a power drill to form a hole in the workpiece and a power installation tool to set a fastener in the predrilled hole. It is already known to use a single power unit and provide a number of interchangeable bits to perform the drilling function and the torquing function. In my co-pending application Ser. No. 353,223, filed Mar. 1, 1982, I disclose a reversible drilling and torquing adapter which comprises an elongated body member having an opening at one end to accommodate a drill bit and an opening at the opposite end to accommodate a fastener driver. The adapter is externally symmetrical and self-contained so that either end is readily attachable to the power unit or an elongated sleeve which attaches to the power unit. The drill bit and the fastener driver are retained in their respective ends of the adapter by means of set screws extending radially through the adapter and in communication with the axial bores which house the bit and driver.

In many applications the worker is on scaffolding or ladders or in some other location where it is not convenient to loosen the set screw and change the drill bit or fastener driver. This is particularly a problem with respect to the drill bit since drill bit life is unpredictable both as to standard wear and to accidental breakage.

Quick release mechanisms for drills are already known for use with standard tooling. However, these quick release mechanisms are in the form of spring loaded chucks with ball retainers which are external of the elongated sleeve of the power unit. In addition, these quick release chucks accommodate only large drills. Presently quick release means are not available for adapters used in combination drilling and torquing tools.

In my co-pending application Ser. No. 437,542, filed Oct. 29, 1982, I disclose a quick release adapter in which the shuttle of the preferred embodiment is contained within the bore of the main housing. This serves the dual purpose of locking the shuttle in place so that it cannot release the drill bit and enabling the shuttle to transmit torque from the holder to the drill bit. However, the drill bit must often be changed while it is still hot from use. It is difficult for the use to grasp the main housing and depress the shuttle to change the drill bit while the drill bit is too hot to handle. The adapter, because of its smaller size, is easier to grasp, therefore, if the portion of the adapter that includes the shuttle is external of the main housing the user can grasp the adapter rather than the drill bit while changing a hot drill bit. In addition, the size and weight of the tool may be reduced by shortening the main housing so that the shuttle is not located within the housing. Thus, because the shuttle would no longer be restrained by the main housing, an alternative means must be used to transmit the torque from the holder to the drill bit.

SUMMARY OF THE INVENTION

I have now provided a quick release mechanism which is not cumbersome and which is particularly applicable to adapters and reversible adapters for drill bits and fastener drivers. The quick release mechanism is compact and contained internal of the adapter. My quick release mechanism provides for rapid and easy changing of drill bits and the like and requires no additional tooling such as screw drivers or allen wrenches to accomplish the tool change.

My improvement is directed to an adapter for a torquing tool, including an elongated body member having a bore at at least one end to accommodate a working member and a coupling means for detachably attaching the body to the tool. The improvement comprises quick release means internal of the body member and external of the tool to detachably retain the working member within the bore and to the elongated body and means associated with said bore and said working member for transmitting torque from the tool to the working member. A preferred quick release means includes a spring loaded shuttle positioned in an opening extending radially through the body member with the shuttle being movable between a first position locking the working member in the bore and a second position for releasing the working member. A preferred torque transmitting means is a pair of corresponding, opposed surfaces disposed internal of the adapter and on the working member, respectively.

My quick release means finds particular application in a reversible adapter having a fastener driver at one end and a drill bit at the other with the quick release means being adaptable to either or both ends of the adapter.

DESCRIPTION OF THE PREFERRED EMBODIMENTS

Figure 1:
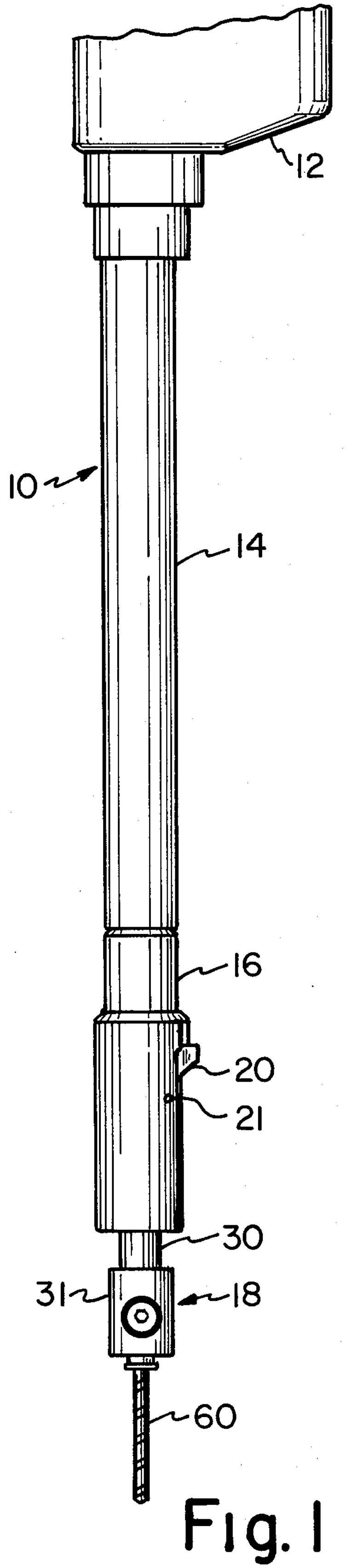
FIG. 1 is a front elevation of a power tool including a sleeve and an adapter.

The tool, generally designated 10, comprises a power unit 12, an elongated sleeve 14 attached to the power unit 12 and a sleeve extension 16 attached to the elongated sleeve 14 by conventional means which do not form a part of the subject invention, FIG. 1. A reversible adapter 18 is attached to the distal end of the sleeve extension 16 and the two sleeves and adapter are caused to rotate by the power unit 12.

Figure 2:
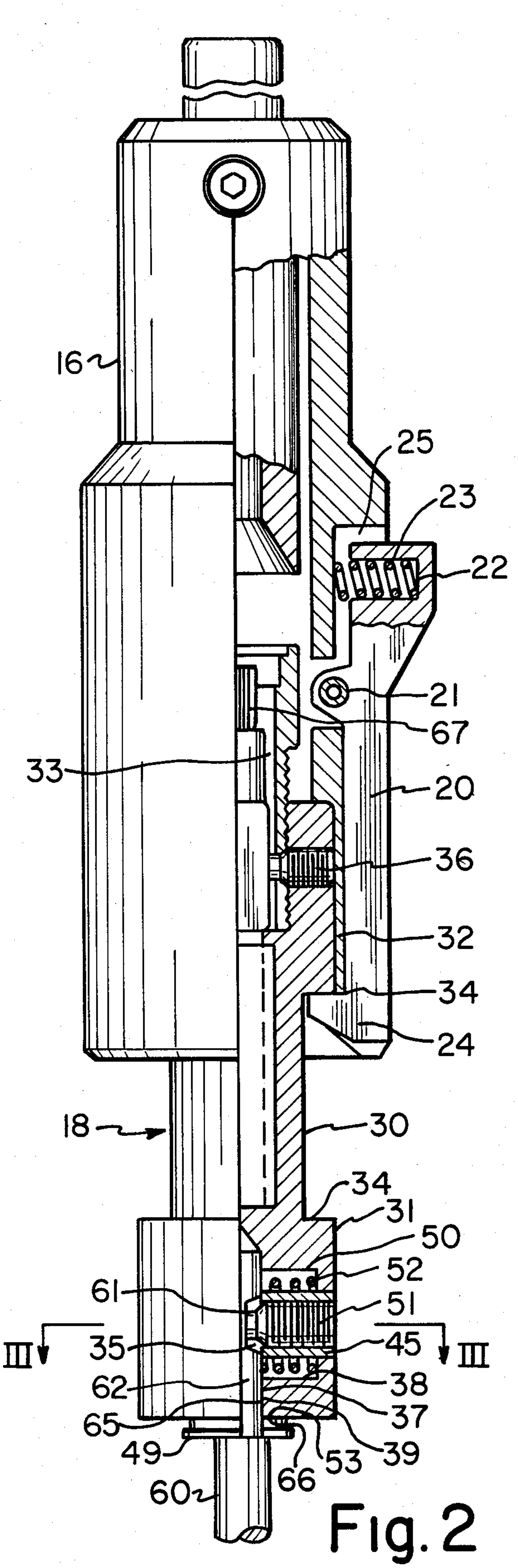
FIG. 2 is a front elevation partly in section showing the sleeve and the adapter.

The sleeve extension 16 includes a slot 25 which accommodates a latch member 20 by means of pivot pin 21 extending through the sleeve and transverse of the slot, FIG. 2. Coil spring 22 is housed within slot 23 in latch member 20 and is attached to sleeve extension 16 so as to maintain latch member 20 in the closed position. Latch member 20 terminates in an inwardly extending finger 24 which detachably retains the adapter 18 within the bore of sleeve extension 16.

The adapter 18 comprises an elongated cylindrical body 30 having an enlarged cylindrical section 31 inward of one end and an enlarged cylindrical section 32 inward of the other end, FIG. 2. Each enlarged section defines a shoulder 34 against which finger 24 of latch member 20 engages so as to retain the adapter 18 in the sleeve extension 16. Depression of the latch member 20 causes pivoting about the pin 21 and disengages the finger 24 from the shoulder 34 permitting the adapter to be removed and/or reversed, FIG. 2.

A driving tool conforming in shape to the head of the screw to be driven, e.g. a hex-shaped fastener driver 67, is secured within a blind bore 33 extending into one end of the adapter 18 by means of a set screw 36 which extends radially through the adapter wall and into the bore 33. An adjustment screw (not shown) is located at the blind end of the bore 33 to effect depth adjustments to the fastener driver.

A bore 35 extends in the opposite end of the adapter 18 from bore 33 to accommodate a drill bit 60. The lower portion 37 of bore 35 has a D-shaped cross-section. Thus, adapter 18 includes flat surface 39. Washer 49 is disposed along drill bit 60 so that it abuts the lower surface 53 of adapter 18.

Figure 4:
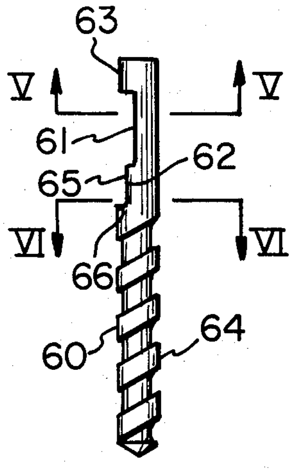
FIG. 4 is a front elevation of a drill bit adapted for use with my invention.
Figure 5:
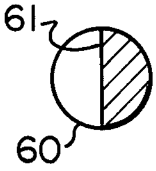
FIG. 5 is a section taken along section lines V—V of FIG. 4.
Figure 6:
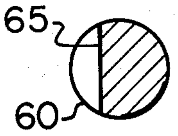
FIG. 6 is a section taken along section lines VI—VI of FIG. 4.

The drill bit 60 includes a flattened shank 61 of hemispherical cross section spaced between flattened shank 62 and the end section 63, FIGS. 4 and 5. Flattened shank 62 having a D-shaped cross section corresponding to that of portion 37 of bore 35 in adapter 18 is spaced between drilling portion 64 and flattened shank 61, FIGS. 4 and 6. Flattened shank 62 includes flat surface 65 and shoulder 66 formed between surface 65 and drilling portion 64.

The quick release mechanism is housed within an opening 38 extending radially through the adapter 18 and into the bore 35, FIG. 2. The major component of the quick release mechanism is the shuttle 40, FIG. 3. Shuttle 40 includes an enlarged central section 43 which is dimensioned for sliding engagement within opening 38 of adapter 18. A lug 41 extends outwardly from central section 43 at one end and a reduced end section 45 including an axial threaded bore 46 extends outwardly from the other end. A retaining slot 42 is located along a portion of the central enlarged section 43. A central opening 44 extends through the central section 43 and in communication with bore 46.

Figure 3:
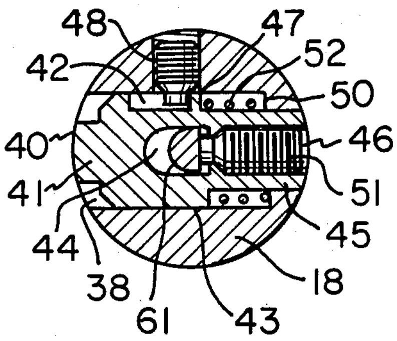
FIG. 3 is a section taken along section lines III—III of FIG. 2 and including a drill bit.

The positioning of the shuttle 40 in the adapter 18 is best seen in FIG. 3. A set screw 48 extends through adapter 18 and terminates in slot 42 of shuttle 40 so as to retain shuttle 40 within opening 38. Lug 41 extends out of opening 38 in adapter 18, FIG. 3. Shuttle 40 is spring loaded by means of coil spring 52 housed between shoulder 47 of shuttle 40 and shoulder 50 formed within the opening 44 and internal of the adapter 18. An appropriately tipped set screw 51 threadably engages tap 46 in the reduced end section 45 of shuttle 40 so as to extend into the clear through opening 44. Set screw 51 permits adjustment of the shuttle 40 within the adapter 18.

In operation, lug 41 is depressed inward causing compaction of coil spring 52. The drill 60 is positioned in the drill bore 35 post opening 44 of the shuttle 40 so that surface 65 of drill bit contacts surface 39 of adapter 18 and shoulder 66 of drill bit 60 contacts the lower outer surface 53 of adapter 30. Shuttle 40 is then released causing the set screw 51 to contact drill bit 60 along the flattened shank 61. The contact between the set screw 51 and the flattened surface 61 of the drill 60 causes the drill 60 to be retained within the adapter 18. The contact between surfaces 39 and 53 of adapter 18 and surfaces 65 and 66 of the drill 60 causes torque to be transmitted from adapter 18 to drill 60. Thus, drill 60 will rotate with adapter 18. To release the drill 60, lug 41 is depressed, permitting drill 60 to be easily removed and replaced.

Such a quick release mechanism could also be employed at the fastener driver end of the adapter. However, it is more practical at the drill bit end because of the more unexpected and greater need to change the drill bit.

It is to be understood that the present invention is not limited to the particular structure shown in the drawings, but also includes any modification within the scope of the appended claims.

I claim:

1. In a reversible adapter for a power driven torquing tool, including an elongated cylindrical body having a bore extending inward from each of a first and second end and adapted to accommodate a fastener driver and a drill bit respectively, said adapter being connectable at both its first and second ends to the torquing tool so as to be reversible in relation thereto, the improvement comprising quick release means external of the tool and cooperating with at least one of said bores to detachably retain the driver or bit within the bore and means associated with said bore and said driver or bit for transmitting torque from the tool to the driver or bit, said body including an opening radially therethrough and in communication with said at least one bore and one said quick release means including a shuttle positioned in said opening and movable between a first position locking said driver or bit in the bore and a second position for releasing said driver or bit, said shuttle having an enlarged central section and first and second opposing ends, said central section having a clear through opening to accommodate one end of the driver or bit, said first end including a threaded bore in registry with the opening and accommodating a set screw for engaging said driver or bit and said second end extending out of said body member, said at least one bore and said driver or bit including corresponding portions having a D-shaped cross section so that said adapter has an internal surface corresponding to an outer surface of said driver or bit with portions of said surfaces being flat, said driver or bit, in addition, having a shoulder formed between said flat surface and its working portion that abuts a lower outer surface of said adapter when said driver or bit is inserted within said bore of said adapter so that said flat surfaces are in contact with each other and torque may be transmitted from said adapter to said driver or bit.

2. An attachment to a power tool for drilling a hole in a workpiece and torquing a fastener in said drilled hole comprising:

A. an elongated sleeve adapted to connect to the power tool and rotate therewith;

B. a reversible adapter having a first end and an opposite second end, each end adapted to connect to said sleeve, said adapter including a bore axially extending inward from each end, one of said bores accommodating a drill having a flattened shank section and the other of said bores accommodating a fastener driver, said adapter including a clear through opening transverse of a longitudinal axis of the adapter and in communication with an inward end of the drill bore;

C. connecting means detachably joining said adapter to said sleeve;

D. a shuttle positioned in said clear through opening and external of said sleeve, said shuttle including opposite end sections and an enlarged central section having a central opening therethrough and means to engage the flattened shank section of the drill in locking engagement;

E. spring means positioned between the shuttle and the adapter to permit disengagement of the shuttle and the drill; and F. means associated with one of said bores and said drill for transmitting torque from the tool to the drill bit, said means comprising said bore and said drill bit including corresponding portions having a D-shaped cross section so that said adapter has an internal surface corresponding to an outer surface of said drill bit with portions of said surfaces being flat, said drill bit, in addition, having a shoulder formed between said flat surface and its working portion that abuts a lower outer surface of said adapter when said drill bit is inserted within said bore of said adapter so that said flat surfaces are in contact with each other and torque may be transmitted from said adapter to said drill bit.

3. The attachment of claim 2, said engaging means comprising a set screw threadably accommodated in an axially extending threaded tap in one of said opposite ends.

4. The attachment of claim 2, said shuttle including a peripheral slot in the enlarged section and pin means extending through said adapter and cooperating with said slot to retain the shuttle in said adapter.

* * * * *